United States Patent
Tikkanen et al.

(10) Patent No.: US 9,665,712 B2
(45) Date of Patent: May 30, 2017

(54) MALWARE REMOVAL

(75) Inventors: Antti Tikkanen, Espoo (FI); Jarkko Turkulainen, Klaukkala (FI); Daavid Hentunen, Helsinki (FI); Samuli Larvala, Helsinki (FI); Jose Perez Alegre, Espoo (FI)

(73) Assignee: F-SECURE OYJ, Helsinki (FI)

( * ) Notice: Subject to any disclaimer, the term of this patent is extended or adjusted under 35 U.S.C. 154(b) by 669 days.

(21) Appl. No.: 12/660,167

(22) Filed: Feb. 22, 2010

(65) Prior Publication Data
US 2011/0209220 A1 Aug. 25, 2011

(51) Int. Cl.
*G06F 21/56* (2013.01)

(52) U.S. Cl.
CPC ...... *G06F 21/56* (2013.01); *G06F 2221/2105* (2013.01)

(58) Field of Classification Search
CPC ............ G06F 21/56; G06F 2221/2105
USPC ............ 713/1, 100, 188; 726/22-24
See application file for complete search history.

(56) References Cited

U.S. PATENT DOCUMENTS

| | | | |
|---|---|---|---|
| 7,409,719 B2 * | 8/2008 | Armstrong | G06F 21/53 713/1 |
| 7,480,793 B1 * | 1/2009 | Marsh | 713/2 |
| 7,853,826 B2 * | 12/2010 | Bramley | G06F 9/485 714/13 |
| 7,861,303 B2 * | 12/2010 | Kouznetsov | G06F 21/56 726/22 |
| 7,873,957 B2 * | 1/2011 | Nallipogu et al. | 717/168 |
| 7,895,590 B2 * | 2/2011 | Henderson et al. | 717/168 |
| 7,930,531 B2 * | 4/2011 | Chow et al. | 713/2 |
| 7,971,258 B1 * | 6/2011 | Liao et al. | 726/24 |
| 8,195,929 B2 * | 6/2012 | Banga et al. | 713/2 |
| 2003/0154337 A1 * | 8/2003 | Ohno | G06F 9/45533 710/260 |
| 2005/0015606 A1 * | 1/2005 | Blamires | G06F 21/575 713/188 |
| 2006/0136720 A1 * | 6/2006 | Armstrong | G06F 21/53 713/164 |
| 2007/0113062 A1 * | 5/2007 | Osburn et al. | 713/1 |
| 2007/0240216 A1 * | 10/2007 | O'Sullivan et al. | 726/24 |

(Continued)

OTHER PUBLICATIONS

Ye et al.; IMDS: intelligent malware detection system; Published in: Proceeding KDD '07 Proceedings of the 13th ACM SIGKDD international conference on Knowledge discovery and data mining; 2007; pp. 1043-1047; ACM Digital Library.*

(Continued)

*Primary Examiner* — Bradley Holder
(74) *Attorney, Agent, or Firm* — Harrington & Smith

(57) ABSTRACT

A method and apparatus for scanning for or removing malware from a computer device. Under normal circumstances, the computer device is controlled by a first operating system installed in a memory of the device. In order to scan for or remove the malware from the computer device, control of the computer device is passed from the first operating system to a second operating system and, under the control of the second operating system, the device is either scanned for malware or the malware is removed. This allows malware to be detected or removed, even if it has affected the first operating system in some way in order to evade detection or removal.

10 Claims, 3 Drawing Sheets

(56) References Cited

U.S. PATENT DOCUMENTS

| | | | |
|---|---|---|---|
| 2008/0052507 A1* | 2/2008 | Chow | G06F 21/568 713/2 |
| 2008/0189538 A1* | 8/2008 | King et al. | 713/1 |
| 2009/0007100 A1* | 1/2009 | Field | G06F 21/53 718/1 |
| 2009/0038012 A1* | 2/2009 | Bi et al. | 726/24 |
| 2010/0132042 A1* | 5/2010 | Zhang | 726/24 |

OTHER PUBLICATIONS

King et al.; SubVirt: implementing malware with virtual machines; Published in: Security and Privacy, 2006 IEEE Symposium on; Date of Conference: May 21-24, 2006; IEEE Xplore.*

Nellitheertha, H. "Reboot Linux faster using kexec", May 4, 2004, 8 pages.

\* cited by examiner

MALWARE REMOVAL

TECHNICAL FIELD

The present invention relates to a method of removing malware programs from a computer device.

BACKGROUND

Malware is short for malicious software and is used as a term to refer to any software designed to infiltrate or damage a computer device without the owner's informed consent. Malware can include computer viruses, worms, trojan horses, rootkits, adware, spyware and any other malicious and unwanted software.

When a computer device is infected by malware program the user will often notice unwanted behaviour and degradation of system performance as the infection can create unwanted processor activity, memory usage, and network traffic. This can also cause stability issues leading to application or system-wide crashes. The user of an infected computer device may incorrectly assume that poor performance is a result of software flaws or hardware problems, taking inappropriate remedial action, when the actual cause is a malware infection of which they are unaware. Furthermore, even if a malware infection does not cause a perceptible change in the performance of a computer device, it may be performing other malicious functions such as monitoring and stealing potentially valuable commercial, personal and/or financial information, or hijacking a computer device so that it may be exploited for some illegitimate purpose.

Many computer device users make use of anti-virus software to detect and possibly remove malware. However, in order to hide the presence of malware from end users and to evade detection by anti-virus software, malware authors try to hide their malware by designing it to mask or disguise itself as legitimate processes running on the computer. The malware achieves this by injecting its executable code into another process running on the computer. The target process then blindly executes this malware code effectively concealing the source of the malicious behaviour.

Some types of malware are more difficult to detect and remove than others. For example, malware may be in the form of a rootkit, which obscures the fact that the malware is present by hiding files or processes that would otherwise be interpreted as malware activity, or by replacing system executable files with files that appear to be uninfected system executable files.

Removing malware from a computer device can be challenging. For example, if a computer device is running a Windows® operating system, then the anti-virus application tasked with the removal of the malware is also running under the Windows® operating system. If the Windows® operating system has been modified by the malware, then it may prevent the anti-virus application from modifying the necessary files or data to remove the malware.

There are several approaches that can be used to mitigate this problem, as follows:

1. Starting an anti-virus component early during boot-up of the operating system. Some malware programs are designed to run as early as possible during the start-up procedures of the computer. They can then inject themselves into one of the running processes that have been loaded onto the computer device's RAM, before removing almost all references and traces of the malware from the system, such as the original start-up files on the hard disk and any launch point (usually, an entry in the registry) that caused the start-up files to run automatically, keeping only the run-time code inside of target process. This makes it more difficult to detect and remove such malware programs once the anti-virus software is active. Starting the anti-virus component early during boot-up of the operating system relies on the fact that the malware is unlikely to be active before the removal operation starts, and so the anti-virus component has access to all necessary data in order to remove the malware.

2 Starting the anti-virus component late during shut down of the operating system: Typically, the shutdown of a computer system causes all services, including those provided by anti-virus software, to stop any activity. However, there is still a short period during which the malware can set itself to run once the computer is rebooted. As such, some malware programs are designed to re-write themselves onto the hard disk and re-create their launch points to ensure that they will run the next time the computer is started. Starting the anti-virus component late during the shut down of the computer device relies on the fact that the malware is no longer active while the operating system still has enough function to support the anti-virus component in removing the malware. This may not be the case.

3 Booting the computer from a separate medium (such as a CD or a flash drive) to second operating system (for example, a Linux® operating system) and executing an anti-virus component under the second operating system in order to perform removal of the malware.

The first two approaches described above are not always reliable, particularly if the malware has been designed to be active early in the boot sequence or late in a shut down operation. The third approach described above tends to be more effective, but relies on the user of the computer device having access to a separate medium that includes a bootable operating system and the anti-virus application. Furthermore, the third approach may rely on the user of the computer device to modify BIOS settings in order to ensure that the computer device boots from the separate medium rather than the usual start point (typically a hard drive connected to the computer device).

SUMMARY

It is an object of the present invention to provide a method of scanning for or removing sophisticated malware from a computer system.

According to a first aspect of the present invention there is provided a method of scanning for or removing malware from a computer device. Under normal circumstances, the computer device is controlled by a first operating system installed in a memory of the device. In order to scan for or remove the malware from the computer device, control of the computer device is passed from the first operating system to a second operating system and, under the control of the second operating system, the device is either scanned for malware or the malware is removed. This allows malware to be detected or removed, even if it has affected the first operating system in some way in order to evade detection or removal.

As an option, control of the computer device is passed from the first operating system to the second operating system during a shut down operation of the first operating system.

The method optionally comprises, after performing the action selected from scanning the computer device for malware and removing previously identified malware from the device, shutting down the computer device. Alternatively, after performing the action selected from scanning the computer device for malware and removing previously identified malware from the device, control of the computer device is passed back to the first operating system.

The method optionally comprises, prior to passing control of the computer device from the first operating system to the second operating system, sending a message to a remote server, the message including a request for the second operating system, and receiving from the remote server a file image of the second operating system. This allows the computer device to boot from the second operating system, and the server can ensure that the file image of the second operating system is free from malware.

As an option, the method comprises, prior to passing control of the computer device from the first operating system to the second operating system, initiating a shut down of the first operating system. The shut down operation is interrupted prior to completion of the shut down operation, and an environment is set up at the computer device suitable for the second operating system. The shut down operation is optionally interrupted by either hooking an action in the shutdown operation, or requesting a last chance notification of shut down.

According to a second aspect of the present invention there is provided a computer device that is provided with a memory for memory storing a first operating system and an anti-virus application. A processor is provided for executing the anti-virus application under the control of the first operating system. The processor is arranged to pass control of the computer device from the first to a second operating system. The processor is further arranged to perform an action selected from scanning the computer device for malware and removing previously identified malware from the computer device under control of the second operating system.

The computer device is optionally provided with a transceiver for sending a request for the second operating system to a remote server, and subsequently receiving from the remote server a file image of the second operating system Before passing control of the computer device from the first operating system to the second operating, the processor is optionally arranged to initiate a shut down of the first operating system, interrupt the shut down operation prior to completion of the shut down operation, and initialise an environment at the computer device suitable for the second operating system.

Instead of obtaining the second operating system from a remote server, the second operating system is optionally stored at the memory. In this case, the second operating system may be associated with a digital signature, and the processor is arranged to verify the digital signature prior to passing control of the computer device from the first to the second operating system. This reduces the risk of the second operating system being infected with malware.

According to a third aspect of the present invention there is provided a server for use in a communications network. The server is provided with a memory for storing an anti-virus component and an operating system. A transceiver is provided for receiving from a remote computer device a request for the anti-virus component and the operating system. The transceiver is arranged to send to the remote computer device the anti-virus component and the operating system. The operating system is usable by the remote computer device to reboot from the operating system in order to perform anti-virus scanning and/or malware removal.

The operating system is optionally stored as a file image. Furthermore, the operating system may comprise only components required for operation of the computer device and the anti-virus component, in order to minimize the size of the file image.

According to a fourth aspect of the present invention there is provided a computer program comprising computer program code adapted to perform the steps described above in the first aspect of the invention when the program is run on a computer.

According to a fourth aspect of the present invention there is provided a computer program as described above in the fourth aspect of the invention, and embodied on a computer readable medium.

DETAILED DESCRIPTION

The invention provides a computer device with a second operating system that has full access to all of the data stored at the computer device, and so can make any necessary changes to remove malware. The second operating system is not used except when an anti-virus component is required, and so is unlikely to become infected by malware.

Figure 1:
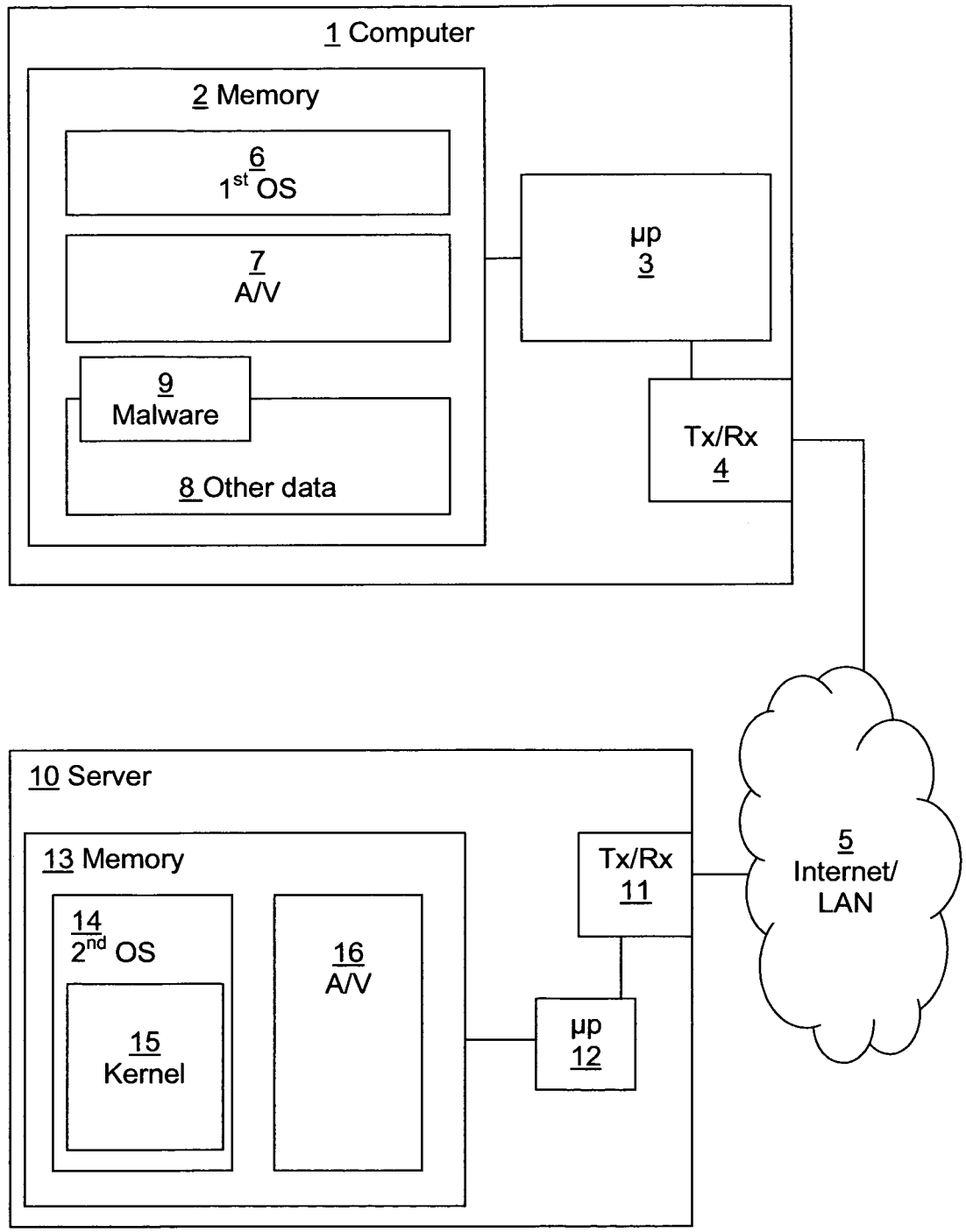
FIG. 1 is a flow diagram illustrating an embodiment of the invention.

Referring to FIG. 1, a computer device 1 is provided. The computer device can be implemented as a combination of computer hardware and software. The computer device 1 is provided with a computer readable medium such as a memory 2, and a processor 3. The memory 2 stores various programs and executable files that are implemented by the processor 3. Note that the memory for a typical desktop computer would be implemented in the form of one or more hard disk drives, but it will be appreciated that other types of memory may be used. A transceiver 4 or other communications device is also provided that allows the computer device 1 to communicate with remote computer devices via a network 5. Note that while a transceiver is described, any other suitable device or combination of devices could be used, for example a separate transmitter and receiver.

The memory 2 has stored upon it a first operating system 6 and an anti-virus application 7 that includes a scanning component removal component. In addition to this, other data 8 may be stored at the memory 2. In normal use, the computer device boots up with and uses the first operating system 6.

The computer device 1 has been infected with malware 9, which may have components stored in the kernel of the first operating system 6 or with the other data 8.

The anti-virus application 7 can perform scans of files in the memory 2 and in most circumstances, remove any malware found during the scan. In this instance, the anti-virus application finds evidence of the malware 9 and determines that it may not be able to successfully remove the malware 9. It may determine this from data obtained from a malware library or other means.

In order to remove the malware 12, the anti-virus application 7 initiates a reboot procedure for the computer device 1. During the reboot procedure, the transceiver 4 communicates with a remote server 10 via the network 5. The server may be maintained by a company that provides anti-virus software. The server 10 comprises a transceiver 11 and a processor 12. A memory 13 is also provided. A second operating system 14 is stored in the memory. The second operating system 14 includes kernel components 15 comprising basic process, memory and device management functions of the second operating system 14. Furthermore, an anti-virus component 16 may be provided. The anti-virus component may include scanning and removal components.

When the computer device 1 contacts the server 10, the server sends an image of the second operating system 14 to the computer device. The second operating system is known to be clean and free from malware.

When the computer device 1 receives a file image of the second operating system 14 from the server 10, it initiates a warm reboot in order to reboot using the kernel 15 of the second operating system 14. The second operating system is provided with an associated anti-virus component 16 that has full access to all of the data stored in the memory 2 of the computer device, and may even have been sent instructions from the anti-virus application 7 stored at the computer device 1 on the nature of the malware 9. The anti-virus component 16 associated with the second operating system 14 can therefore remove the malware 9 from the computer device 1.

Once the malware 9 has been removed from the memory 2, the computer device 1 may shut down or may re-boot using the first operating system 6, allowing the user of the computer device to continue working. It is typically most convenient to initiate the reboot to the second operating system 14 from the first operating system 6 during a shut down of the first operating system, but this is not a requirement for the invention. Booting to the second operating system 14 may occur at any time, and need not be part of a shut down of the computer device 1.

Note also that whilst the second operating system 14 is provided with an associated anti-virus 16 component for removing malware, it may also include an anti-virus component for scanning. If the anti-virus application 7 at the computer device 1 is suspicious of data or an activity at the computer device 1 but cannot identify it as malware, the anti-virus component 16 may perform a scan of the memory 2.

The first and second operating systems may be different operating systems (e.g. Windows® and Linux®), or may be two instances of the same basic operating system. However, in order to reduce the amount of data that must be transmitted from the server 10 to the computer device 1, the second operating system may be optimized to only include components absolutely necessary for the basic function of the computer device 1 and the anti-virus component 16. Alternatively, the second operating system 14 may not be provided with an associated anti-virus component 16 at all. In this case, the second operating system uses the anti-virus application 7 already stored in the memory 2 of the computer device 1.

To illustrate the invention by way of an example, assume the first operating system 6 is a Windows® operating system that is running an anti-virus application 7. The anti-virus application 7 detects that malware 9 is present on the computer device 1, but is unable to remove the malware 9 because the Windows® operating system 6 has been modified by the malware 9 to prevent this.

In this example, the malware 9 is of a type that attempts to start very early in the boot process of the first operating system 6. It starts loading immediately after the BIOS code by infecting the Master Boot Record (for example, Mebroot) or by infecting a critical system driver such as the disk driver (for example, TDL3). Removal with an early-start removal component, as described in the background to the invention, is challenging in both cases.

Figure 2:
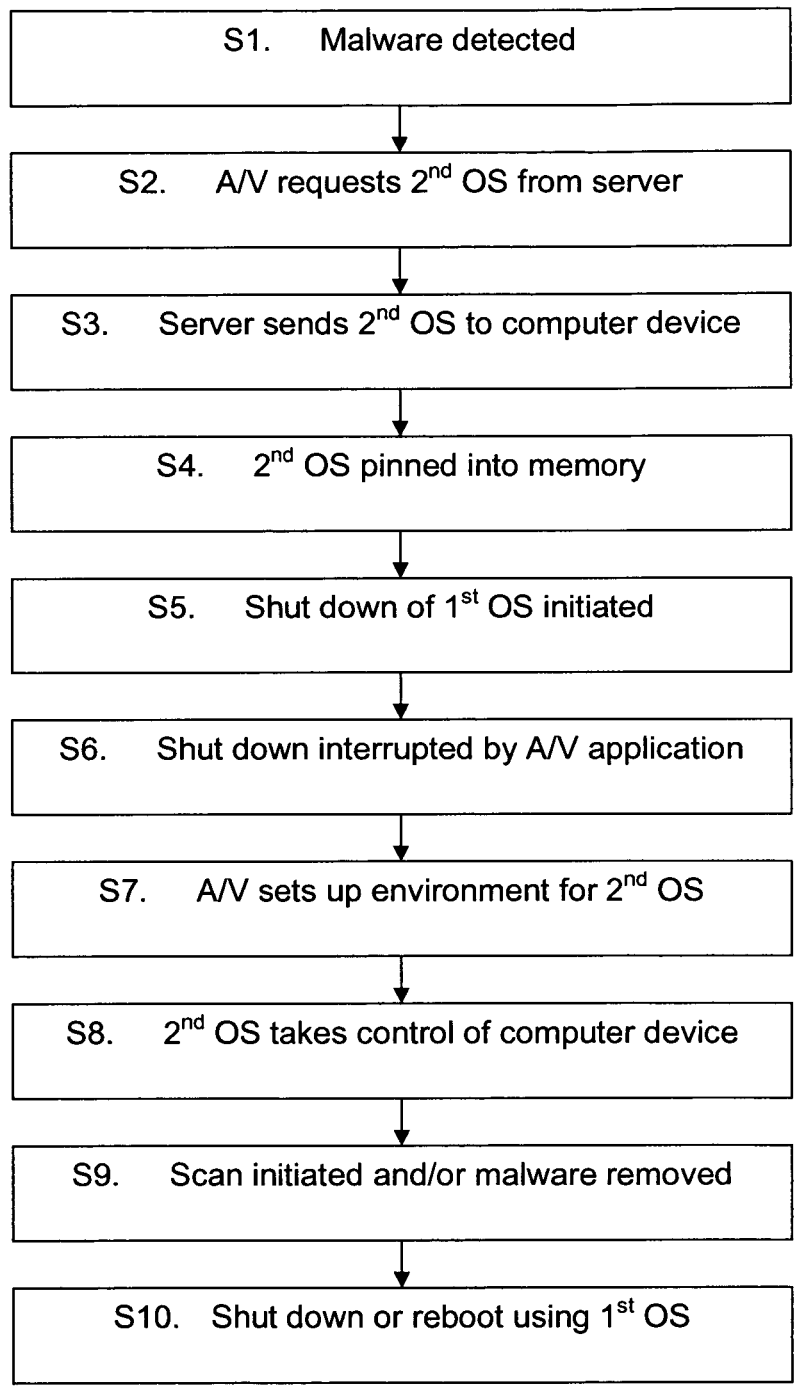
FIG. 2 illustrates schematically in a block diagram a computer system according to an embodiment of the present invention.

Referring to FIG. 2, this embodiment of the invention operates as follows:

S1. The anti-virus application 7 detects malware 9 running on the infected Windows computer device 1.

S2. The anti-virus application 7 sends a message to the server 10 requesting a customized Linux installation 14 that has the necessary drivers 15 and removal components 16. The message may also include information identifying the nature of the malware 9, if this is known.

S3. The server sends a file image of the customized Linux installation 14 to the computer device.

S4. The computer device 1 receives the customized Linux installation 14 and pins it into the memory 2 using a driver running in the first operating system 6 kernel.

S5. A shut down of the first operating system 6 is initiated.

S6. By hooking or otherwise interrupting the shut down of the first operating system 6 in the final stages of shut down, the anti-virus application 7 gains control of the computer device 1 just before shut down is completed. This may be achieved for example by hooking HAL!ReturnToFirmware( ) in the Windows® kernel.

S7. A stub loader activated by the anti-virus application 7 sets up the environment (for example, memory allocations and so on) according to specifications of kexec for Linux and passes necessary virus removal information to the second operating system 14. Kexec is a Linux application that allows the computer device 1 to boot up using the second operating system 14 (a Linux operating system) without having to initialize the hardware and firmware of the computer device 1. It is not necessary to go through this stage again, as the second operating system 14 is being booted in order to remove the malware 9. Kexec is described fully at http://www.ibm.com/developerworks/linux/library/l-kexec.html.

S8. The stub loader transfers control of the computer device 1 to the loaded Linux operating system 14.

S9. The Linux operating system 14, running in a clean environment, uses its anti-virus component 16 to remove the malware. Alternatively, the anti-virus component 16 may perform a scan of the memory 2 before attempting to remove the malware 9 infecting the computer device.

S10. Once the malware has been removed, the Linux operating system 14 either completes the shut down procedure for the computer device 1, or reboots the computer device 1 using the Windows® operating system 6.

Note that For a 64-bit Windows OS, PatchGuard may prevent hooking HAL!ReturnToFirmware( ) This may be countered using one of two approaches:

1. Use a driver to request last chance notification of shutdown and hook HAL!ReturnToFirmware( ) at this point, assuming that PatchGuard is no longer running owing to the shutdown procedure.

2. Alternatively, the jump to Linux can be performed from a last-chance notification function. In this case, the first operating system may not be completely shut down, so there is a risk of data loss.

It will be appreciated by the person of skill in the art that various modifications may be made to the above described embodiments without departing from the scope of the present invention as described in the claims. For example, whilst the embodiment above describes the anti-virus component 16 of the second operating system 14 automatically removing the suspected malware 9, the anti-virus component 16 could alternatively check if there are any predefined procedures, in the form of a user-definable profile or centrally administered policy, for handling such malware 9. If there are some predefined procedures, then the anti-virus component 16 will take whatever action is required according to these policies. If there are no predefined procedures, the anti-virus component 16 will prompt the user to select what action they would like to take regarding the malware 9. For example, the anti-virus component 16 may request the user's permission to delete the malware 9 or perform some other action to disinfect the computer device 1.

Figure 3:
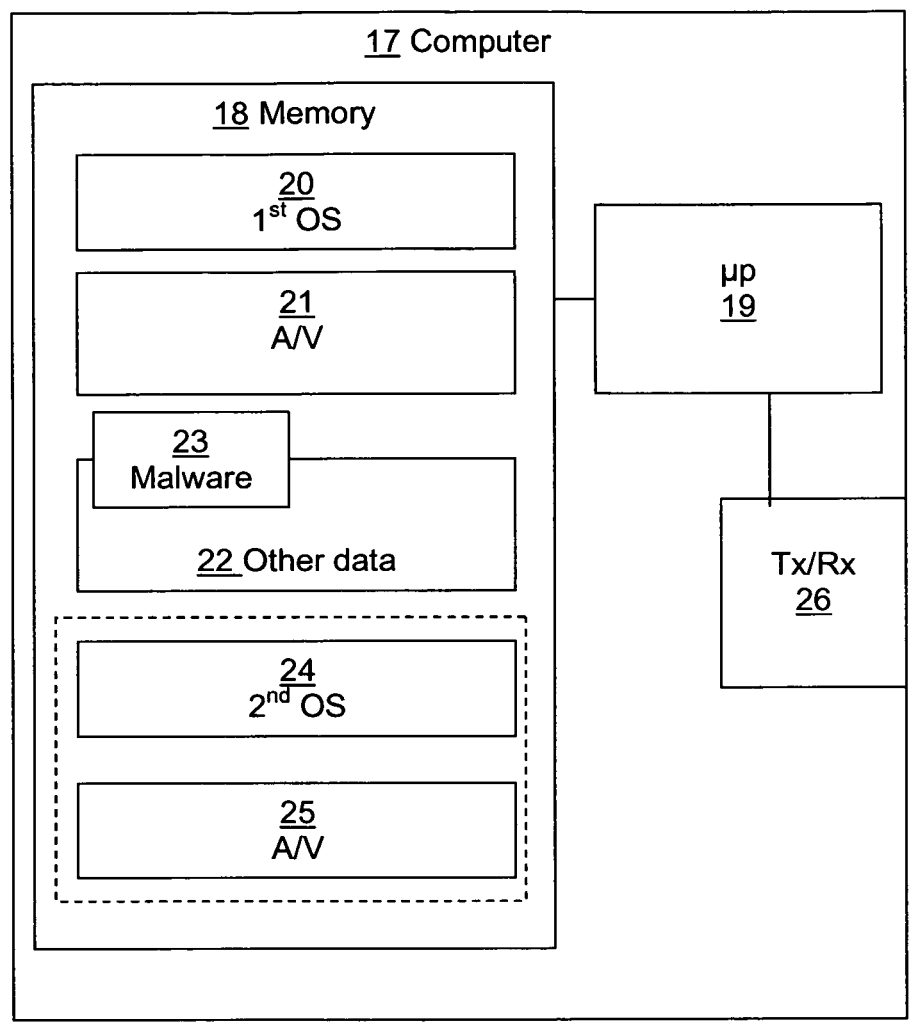
FIG. 3 illustrates schematically in a block diagram a computer system according to a second embodiment of the present invention.

Furthermore, the second operating system 17 does not necessarily need to be obtained from a remote server 10. Referring to FIG. 3 herein, a computer device 17 is illustrated according to a second embodiment of the invention. As with the computer device 1 described above, the computer device 17 of the second embodiment of the invention is provided with a memory 18 and a processor 19. The memory 2 stores various programs and executable files that are implemented by the processor 3.

A first operating system 20 and an anti-virus application 21 are stored in the memory and, under normal operation, the computer device 17 is controlled by the first operating system 20. The memory 18 also stores other data 22, such as files, libraries and executables, and malware 23 is also present in the memory 18. According to the second embodiment of the invention, the memory 18 is also used to store a second operating system 24 and may also store a second anti-virus component 25 associated with the second operating system 24. In order to reduce the risk that the second operating system 24 and the anti-virus component 25 is infected with the malware 23, the second operating system 24 and the anti-virus component 24 are digitally signed.

When the control of the computer device 17 is passed from the first operating system 20 to the second operating system 24, a check may be made of the digital signature to ensure that the second operating system is not infected with the malware 23. This may be done by using a transceiver 26 to communicate with a remote server to check the validity of the digital signature.

The second embodiment of the invention is otherwise compatible with the first embodiment of the invention, in that control is passed from the first operating system 20 to the second operating system 24 in order to scan for and/or remove the malware 23 from the memory 18 of the computer device. The advantage of the second embodiment of the invention is that there is no need to obtain a file image of the second operating system from a remote server, which can be time and bandwidth intensive.

Note also that whilst the above description refers to obtaining a file image of the second operating system 14 from a remote server 10, or from the memory 2 of the computer device, a file image of the second operating system 14 can be obtained from any source provided that the file image is unlikely to be infected by the malware.

The invention claimed is:

1. A method of scanning for and removing malware from a computer device, the computer device being controlled by a first operating system installed in a memory of the computer device, the method comprising:
   performing a malware scan of files in the memory of the computer device;
   when evidence of malware is detected, obtaining a second operating system from a remote server;
   initiating a shutdown of the first operating system;
   interrupting the shutdown during final stages and prior to completion of the shutdown;
   setting up an environment at the computer device suitable for the second operating system;
   loading the second operating system during the interruption of the shutdown of the first operating system;
   passing control of the computer device from the first operating system to the second operating system; and
   under the control of the second operating system, removing previously identified malware from the computer device.

2. The method according to claim 1, further comprising, after performing an action selected from scanning the computer device for malware and removing previously identified malware from the device, completing the shutdown of the first operating system.

3. The method according to claim 1, further comprising, after performing an action selected from scanning the computer device for malware and removing previously identified malware from the device, passing control of the computer device back to the first operating system.

4. The method according to claim 1, further comprising, when the second operating system is obtained from the remote server:
   sending a message to the remote server, the message including a request for the second operating system; and
   receiving from the remote server a file image of the second operating system.

5. The method according to claim 1, wherein interrupting the shutdown prior to completion of the shutdown is by one of hooking an action in the shutdown and requesting a last chance notification of the shutdown.

6. A computer device comprising:
   a memory, the memory storing a first operating system and an anti-virus application;
   a computer processor for executing the anti-virus application under the first operating system to detect evidence of malware in files of the memory of the computer device;
   the processor being further arranged to respond to detection of evidence of malware by:
   obtaining a second operating system from a remote server;
   initiating a shutdown of the first operating system;
   interrupting the shutdown during final stages and prior to completion of the shutdown;
   setting up an environment at the computer device suitable for the second operating system; and
   loading the second operating system during the interruption of the shutdown of the first operating system;
   wherein the processor is arranged to pass control of the computer device from the first operating system to the second operating system, and the processor is further arranged to remove previously identified malware from the computer device under the control of the second operating system.

7. The computer device according to claim 6, further comprising a transceiver for sending a request for the second operating system to a remote server and subsequently receiving from the remote server a file image of the second operating system.

8. The computer device according to claim 6, wherein the memory is further arranged to store the second operating system.

9. The computer device according to claim 6, wherein the memory is further arranged to store the second operating system, the second operating system being associated with a digital signature, wherein the processor is arranged to verify the digital signature prior to passing control of the computer device from the first operating system to the second operating system.

10. A computer program product comprising a non-transitory computer-readable storage medium bearing computer program code embodied therein for use with a computer device under the control of a first operating system, the computer program code comprising code for:

performing a malware scan of files in a memory of the computer device;

when evidence of malware is detected, obtaining a second operating system from a remote server;

initiating a shutdown of the first operating system;

interrupting the shutdown during final stages and prior to completion of the shutdown;

setting up an environment at the computer device suitable for the second operating system;

loading the second operating system during the interruption of the shutdown of the first operating system;

passing control of the computer device from the first operating system to the second operating system just before the shut down is completed; and under the control of the second operating system, removing previously identified malware from the computer device.

* * * * *